United States Patent
Koga

(10) Patent No.: US 6,473,539 B1
(45) Date of Patent: *Oct. 29, 2002

(54) IMAGE PROCESSING APPARATUS WITH AN IMAGE AND BINDING POSITIONS DISPLAY FEATURE, RELATED METHOD, AND MEDIUM

(75) Inventor: Katsuhide Koga, Mishima (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,349

(22) Filed: Dec. 2, 1997

Related U.S. Application Data

(63) Continuation of application No. 09/982,349, filed on Dec. 2, 1997.

(30) Foreign Application Priority Data

Dec. 2, 1996 (JP) .............................. 8-321613
Dec. 16, 1996 (JP) .............................. 8-335584

(51) Int. Cl.⁷ ................................................ G06K 9/20
(52) U.S. Cl. ...................................... 382/317; 382/292
(58) Field of Search ........................... 399/193; 382/292

(56) References Cited

U.S. PATENT DOCUMENTS

| | | | | |
|---|---|---|---|---|
| 4,136,332 A | * | 1/1979 | Kadota et al. .......... | 340/146.3 |
| 4,740,810 A | * | 4/1988 | Ito ............................ | 355/56 |
| 5,485,245 A | * | 1/1996 | Kobayashi et al. ......... | 355/202 |
| 5,774,232 A | * | 6/1998 | Tabata et al. ............... | 358/448 |
| 5,787,195 A | * | 7/1998 | Tsujimoto et al. .......... | 382/176 |
| 5,875,035 A | * | 2/1999 | Motosugi et al. ........... | 358/296 |
| 6,115,510 A | | 9/2000 | Koga ........................ | 382/309 |

FOREIGN PATENT DOCUMENTS

JP 6-233114 8/1994

* cited by examiner

Primary Examiner—Phouc Tran
Assistant Examiner—Amir Alavi
(74) Attorney, Agent, or Firm—Fitzpatrick, Cella, Harper & Scinto

(57) ABSTRACT

An image processing apparatus for preventing overlap of the region of an image of an original with the positions of staples is provided. It is determined if the positions of staples set through an operation unit overlap with the image of the original read by a reader unit. If the result of the determination is affirmative, the distance between an end portion of the image and the positions of staples is calculated. The input image is subjected to parallel movement by an amount of movement corresponding to the calculated distance. An image obtained by synthesizing an image after the parallel movement and an image indicating the positions of staples set through the operation unit is displayed on a display device. In another approach, an image obtained by synthesizing an image of an original read by a reader unit and an image indicating the positions of staples set through an operation unit is displayed on a display device, and it is determined if the positions of staples are present within the region of the image of the original. If the result of the determination is affirmative, a warning is provided.

86 Claims, 12 Drawing Sheets

IMAGE PROCESSING APPARATUS WITH AN IMAGE AND BINDING POSITIONS DISPLAY FEATURE, RELATED METHOD, AND MEDIUM

This application is a continuation of application Ser. No. 09/982,349 filed Dec. 2, 1997.

BACKGROUND OF THE INVENTION

1. Field of the Invention

The present invention relates to an image processing apparatus which can input binding positions of sheets where images are to be recorded.

2. Description of the Related Art

Some of conventional copiers or the like can automatically perform binding processing, such as stapling processing or the like, for recording sheets subjected to copying processing. Some of recent copiers or the like can also select one of one-position binding, two-position binding, and corner binding.

However, in such conventional copiers or the like, since stapling processing is automatically performed irrespective of an image on a recording sheet, the user notices, in some cases, that stapling is performed on a portion where an image is present after completing stapling processing. In such a case, the user is required to perform a very troublesome operation so that the positions of staples do not enter the region of the image, for example, by shifting the original having the image mounted on platen glass of the copier. Furthermore, repetition of such failure results in waste of recording sheets.

SUMMARY OF THE INVENTION

It is an object of the present invention to provide an image processing apparatus in which the above-described problems are solved.

It is another object of the present invention to provide an image processing apparatus in which the relationship between the position of an image and binding positions can be confirmed on a display, and therefore a failure in binding processing can be prevented.

According to one aspect, the present invention which achieves these objectives relates to an image processing apparatus including image input means for inputting an image, binding-position input means for inputting binding positions, image output means for outputting the image input by the image input means in order to record the image on a sheet, determination means for determining if the binding positions input by the binding-position input means are present within a region corresponding to the image to be output by the image output means, image processing means for performing editing processing relevant to the coordinates of the region and the coordinates of the binding positions for the image input by the image input means, and image display means for displaying an image obtained by synthesizing the image to be recorded and an image indicating the binding positions input by the binding-position input means, before outputting the image by the image output means.

According to another aspect, the present invention which achieves these objectives relates to an image processing method including the steps of inputting an image, inputting binding positions, outputting the input image in order to record the image on a sheet, determining if the input binding positions are present within a region corresponding to the image, performing editing processing relevant to the coordinates of the region and the coordinates of the binding positions for the image, and displaying an image obtained by synthesizing the image to be recorded and an image indicating the binding positions before outputting the image.

According to still another aspect, the present invention which achieves these objectives relates to an image processing apparatus including image input means for inputting an image, binding-position input means for inputting binding positions, image output means for outputting the image input by the image input means in order to record the image on a sheet, image display means for displaying an image obtained by synthesizing the image to be recorded and an image indicating the binding positions input by the binding-position input means, before outputting the image by the image output means, determination means for determining if the binding positions input by the binding-position input means are present within a region corresponding to the image to be output by the image output means, and notification means for performing notification in accordance with a result of the determination by the determination means.

According to yet another aspect, the present invention which achieves these objectives relates to an image processing method including the steps of inputting an image, inputting binding positions, outputting the image input by the image input means in order to record the image on a sheet, displaying an image obtained by synthesizing the image to be recorded and an image indicating the binding positions before outputting the image in the outputting step, determining if the input binding positions input in the binding-position inputting step are present within a region corresponding to the image to be output, and performing notification in accordance with a result of the determination in the determining step.

The foregoing and other objects, advantages and features of the present invention will become more apparent from the following description of the preferred embodiments taken in conjunction with the accompanying drawings.

DESCRIPTION OF THE PREFERRED EMBODIMENTS

First Embodiment

Figure 1:
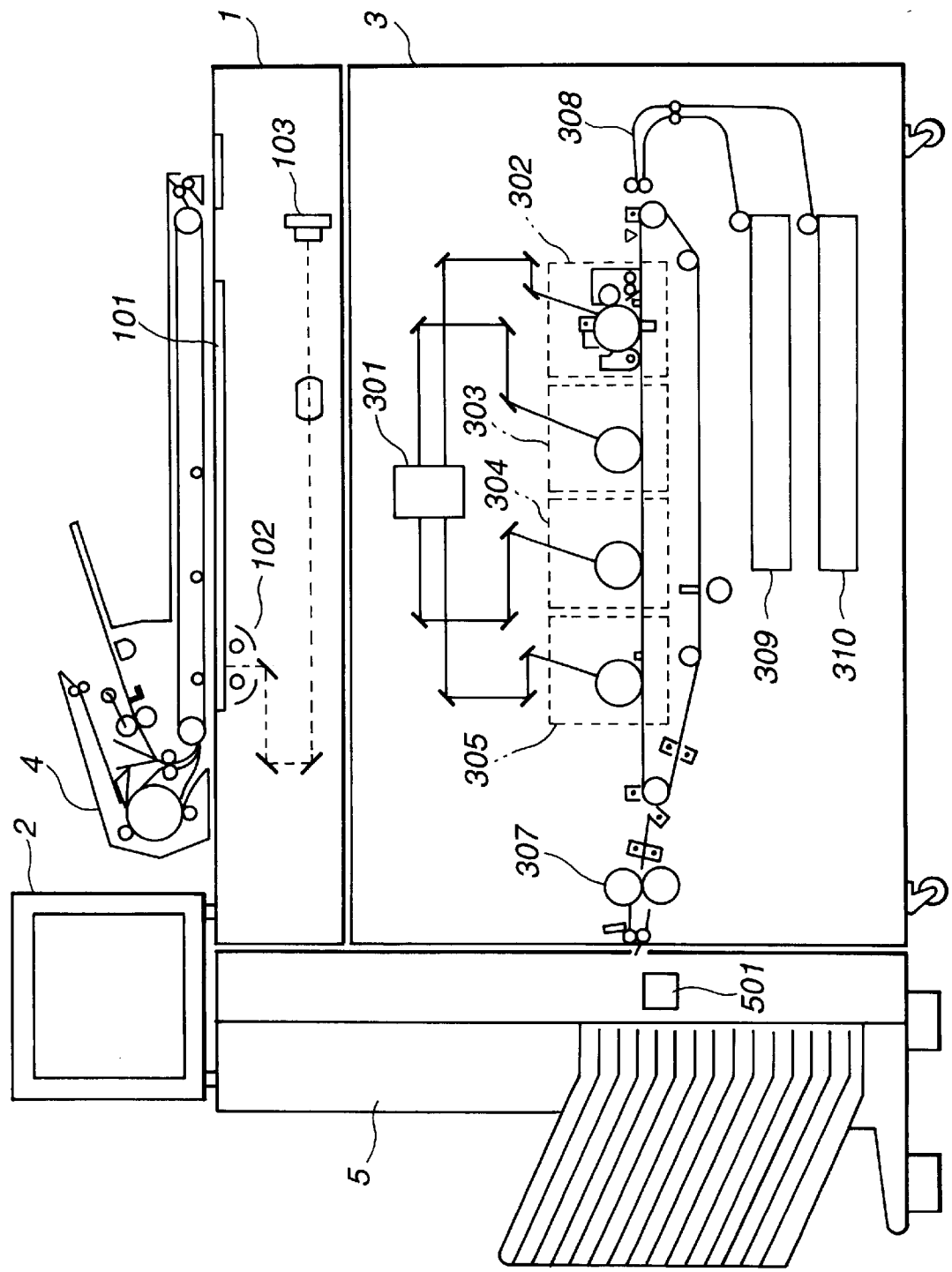
FIG. 1 is a schematic diagram illustrating the configuration of an image forming system according to a first embodiment of the present invention.

FIG. 1 is a schematic diagram illustrating the configuration of an image forming system according to a first embodiment of the present invention. This system includes a reader unit 1 for performing digital editing processing and the like by reading a color original, a printer unit 3 for printing a color image in accordance with digital image signals for respective colors transmitted from the reader unit 1, an original-feeder 4 for feeding an original onto platen glass 101, a sorter 5 for performing stapling processing after sorting recording sheets discharged from the printer unit 3, and a display 2 for displaying in advance (previewing) an image to be formed by the printer unit 3 and the positions of staples to be subjected to stapling processing by the sorter 5. The display 2 comprises a CRT (cathode-ray tube) or an LCD (liquid-crystal display). Before executing image formation, the user can confirm the hue of the image to be formed, the result of image processing, the relationship between the image and the staples, and the like on th display 2.

The reader unit 1 performs exposure scanning of the original fed onto the platen glass 101 by the original-feeder 4 by an optical system 102, and reads the image of the original subjected to exposure scanning by a CCD (charge-coupled device) 103. Image data read by the CCD 103 is transmitted to the printer unit 3 via a circuit (to be described later). The printer unit 3 emits a laser light beam corresponding to the input image data by a laser scanner 301, and projects the laser light beam onto image forming units 302–305 for forming images of respective colors, i.e., Y (yellow), M (magenta), C (cyan) and K (black). The image forming units 302–305 form images corresponding to the projected laser light beam onto a recording sheet fed from one of sheet feeding cassettes 309 and 310 along a conveying path 308. The recording sheet having an image formed thereon is fixed by a fixing roller 307, and is discharged onto the sorter 5.

The sorter 5 sorts recording sheets by a plurality of bins. The sorter 5 has a stapler 501, which performs processing of stapling recording sheets discharged onto a bin. As will be described later, the stapling processing comprises corner binding, one-position binding and two-position binding.

Figure 2:
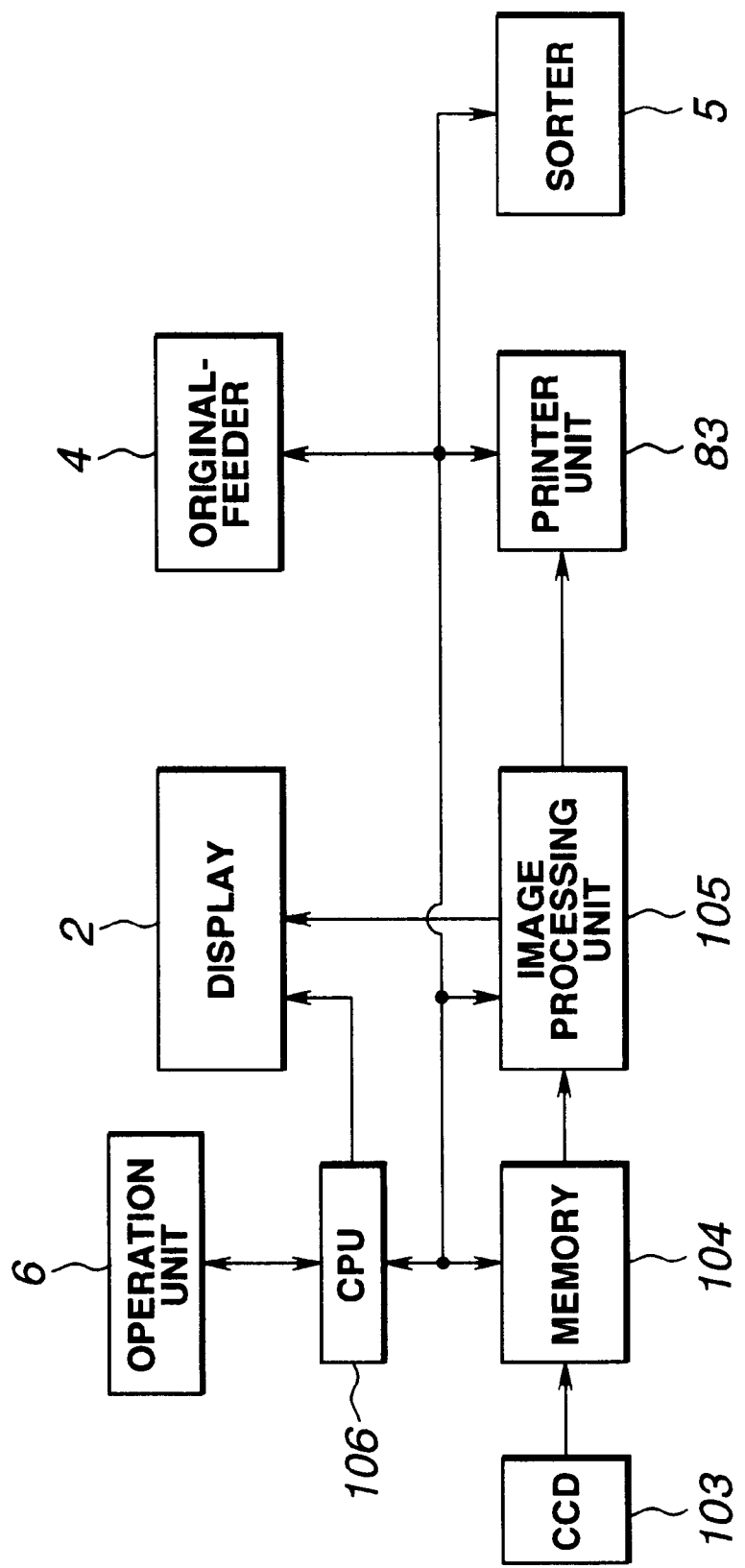
FIG. 2 is a block diagram illustrating control in the image forming system shown in FIG. 1.

FIG. 2 is a block diagram illustrating control in the image forming system. The image data read by the CCD 103 is transmitted to an image processing unit 105 via a memory 104. The memory 104 can store images of a plurality of pages. The image processing unit 105 performs image processing, such as image shift, magnification change, deformation, trimming, masking, color conversion, or the like. The contents of the processing of the image processing unit 105 is instructed from a CPU (central processing unit) 106. The image processing unit 105 outputs image data after image processing to the display 2 in response to an instruction from the CPU 106. The CPU 106 outputs image data indicating staples at the positions of staples set through an operation unit 6, and character data indicating a message to the display 2. The display 2 displays an image obtained by synthesizing the image data and the character data input from the image processing unit 105 and the CPU 106.

The image processing unit 105 outputs image data after the image processing to the printer 3 in response to an instruction from the CPU 106. The CPU 106 outputs instructions to the memory 104, the image processing unit 105, the printer unit 3, the sorter 5 and the original-feeder 4, and inputs status information from the respective units. The CPU 106 also outputs control information relating to an operational picture surface to the operation unit 6, and inputs information relating to contents set at the operation unit 6. In the first embodiment, as will be described later in detail, the CPU 106 inputs information relating to coordinates where an image after image processing is present (the minimum coordinates and the maximum coordinates shown in FIG. 9) from the image processing unit 105.

Figure 3:
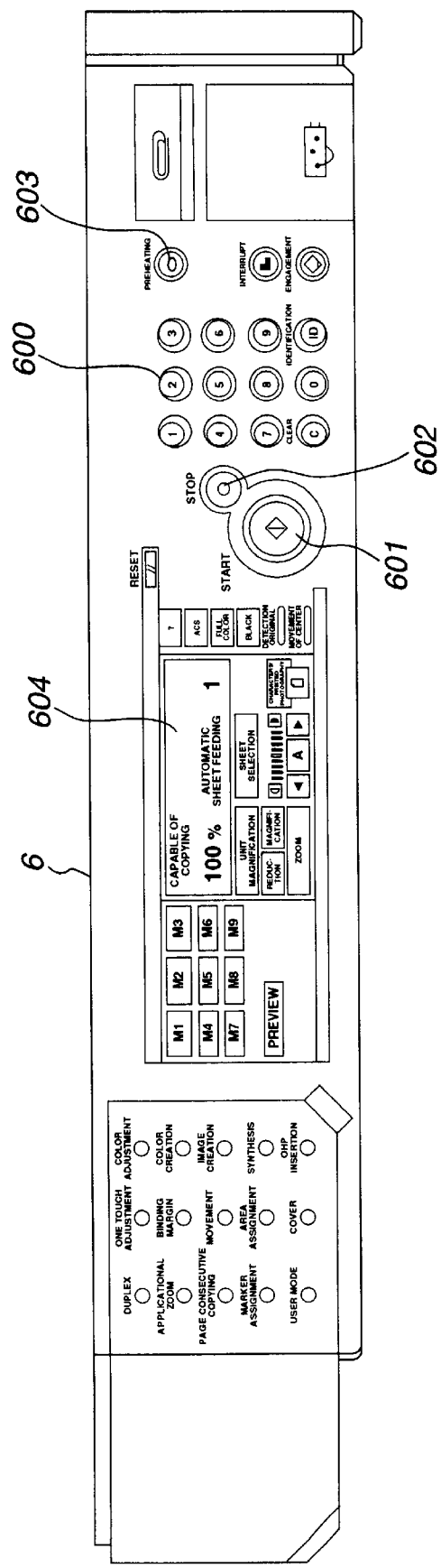
FIG. 3 is a diagram illustrating an external apperance of an operation unit shown in FIG. 2.

FIG. 3 is a diagram illustrating an external apperance of the operation unit 6, which includes, for example, numeric keys 600, a copying start key 601, a stop key 602, a preheating key 603, a touch-panel display unit 604 using an LCD or the like. Although a description of other keys will be omitted, various settings relating to a copying operation, and settings relating to image processing, such as editing processing and the like, can be performed through the operation unit 6.

Figure 4:
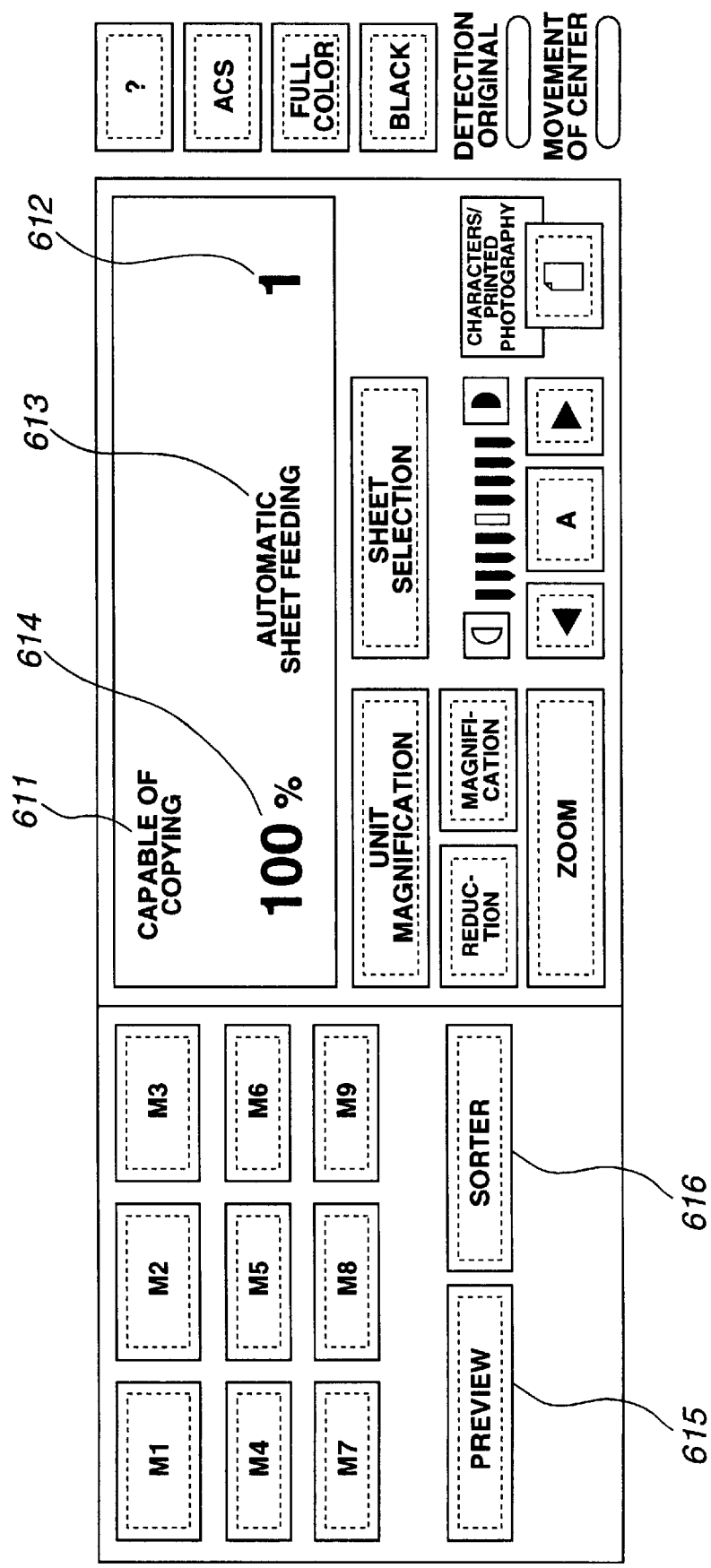
FIG. 4 is a diagram illustrating a standard picture surface of the operation unit.

FIG. 4 is a diagram illustrating a standard picture surface of the display unit 604. In FIG. 4, reference numerals 611, 612, 613 and 614 represents the state of the apparatus, the number of copies set using the numeric keys 600, the size of the sheet, and the copying magnification, respectively. There are also shown a touch-key display 615 for setting a preview mode, and a touch-key display 616 for setting the mode of the sorter 5.

When performing preview processing, the user assigns the magnification of the image, the size of the sheet, and editing processing through the operation unit 6, and depresses the preview-mode key 615 to shift the picture surface from the standard picture surface to a preview operational picture surface, before starting the preview processing.

Figure 5:
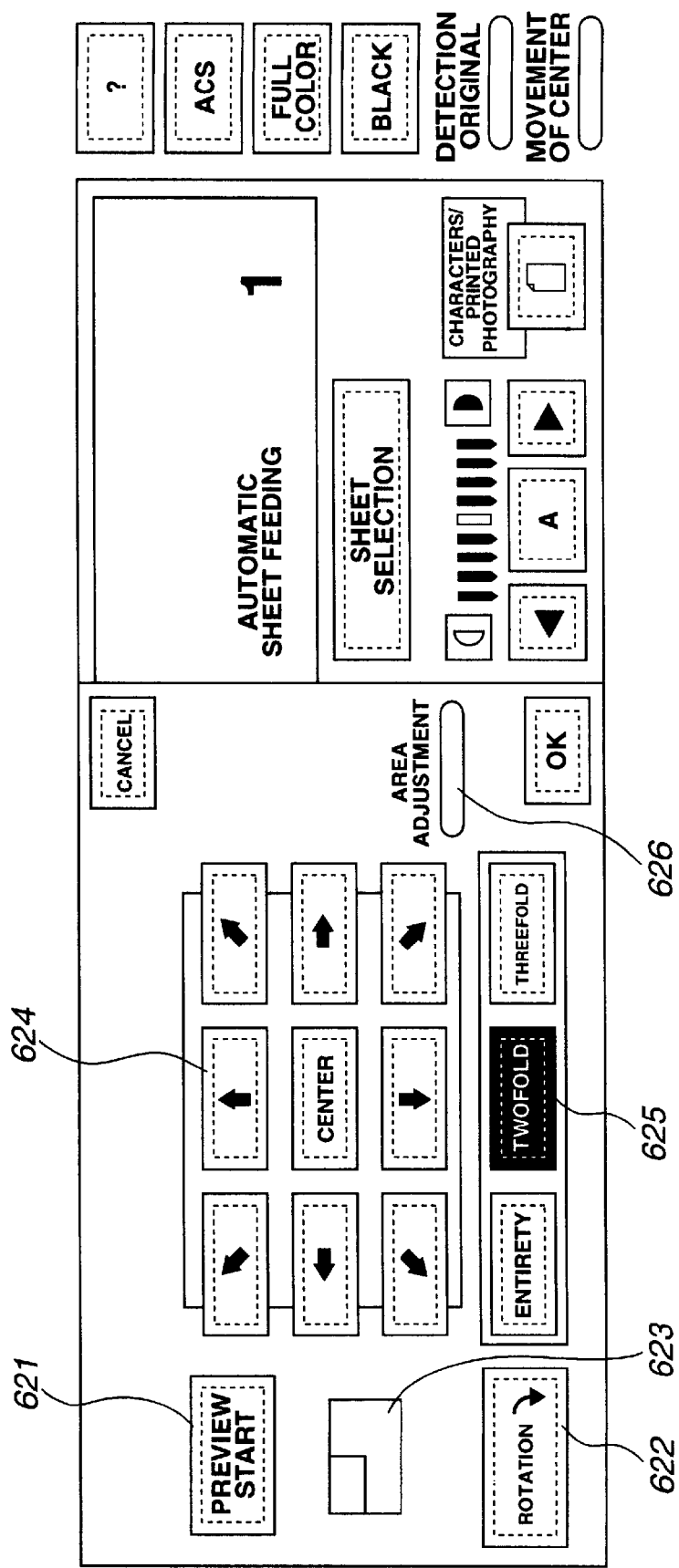
FIG. 5 is a diagram illustrating a picture surface of the operation unit.

FIG. 5 is a diagram illustrating an example of the preview operational picture surface. In FIG. 5, there are shown a preview start key 621, a display-direction setting key 622, an area monitor 623, display-position setting keys 624, display-magnification setting keys 625, and an area fine adjustment key 626. The user first sets an original on the platen glass 101 or the original-feeder 4, and sets the direction of display (longitudinal or lateral) of the original using the display-direction setting key 622. Usually, an image at an original-contact position present at the upper left of the platen glass 101 is displayed at the upper right of the display 2. When the display-direction setting key 622 is depressed, the display of the displaydirection setting key 622 is subjected to black-white reversal, and an image obtained by rotating the original image by 90 degrees is displayed on the display 2.

Figure 6:
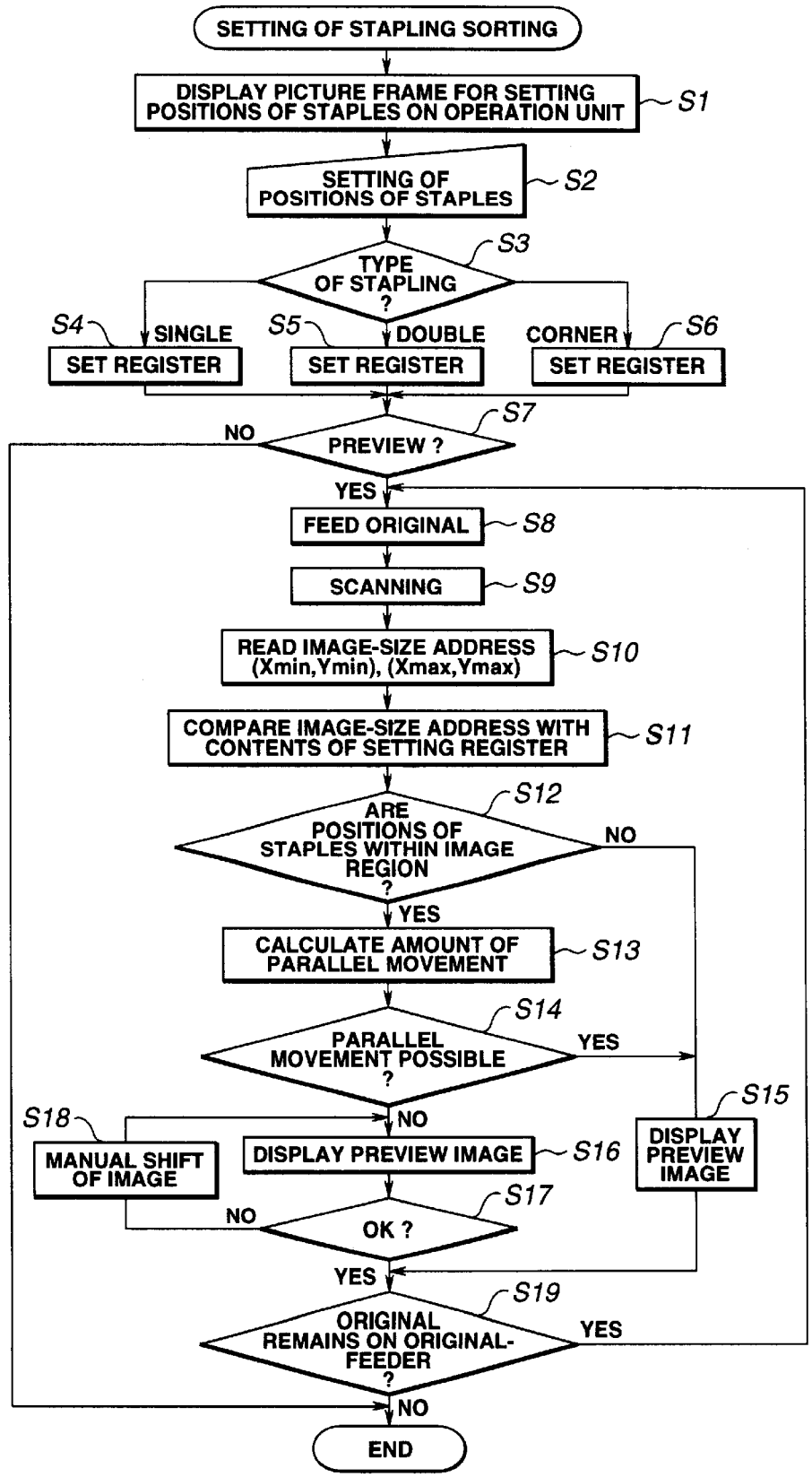
FIG. 6 is a flowchart illustrating control for setting stapling processing.
Figure 7:
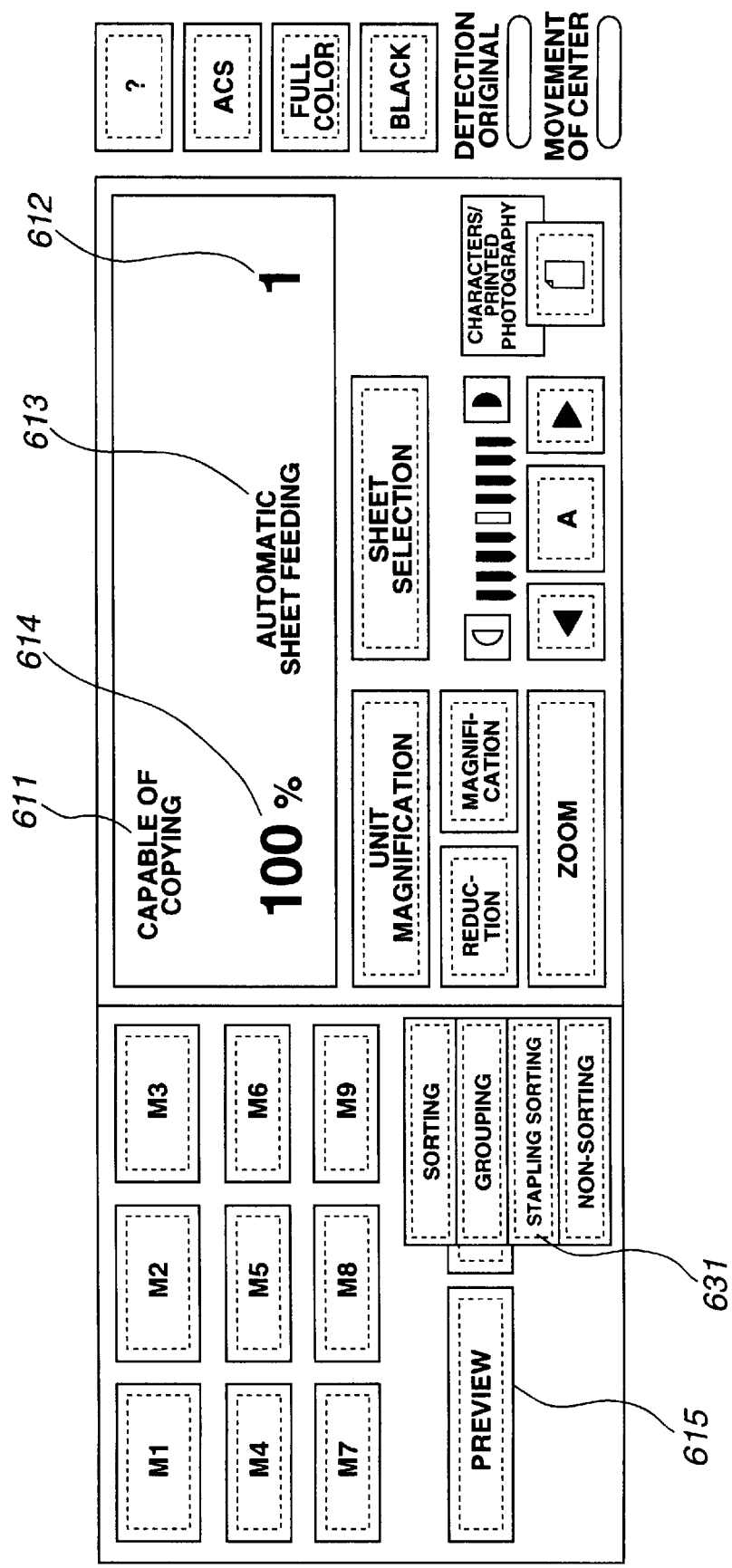
FIGS. 7 and 8 are diagrams, each illustrating a picture surface of the operation unit.
Figure 8:
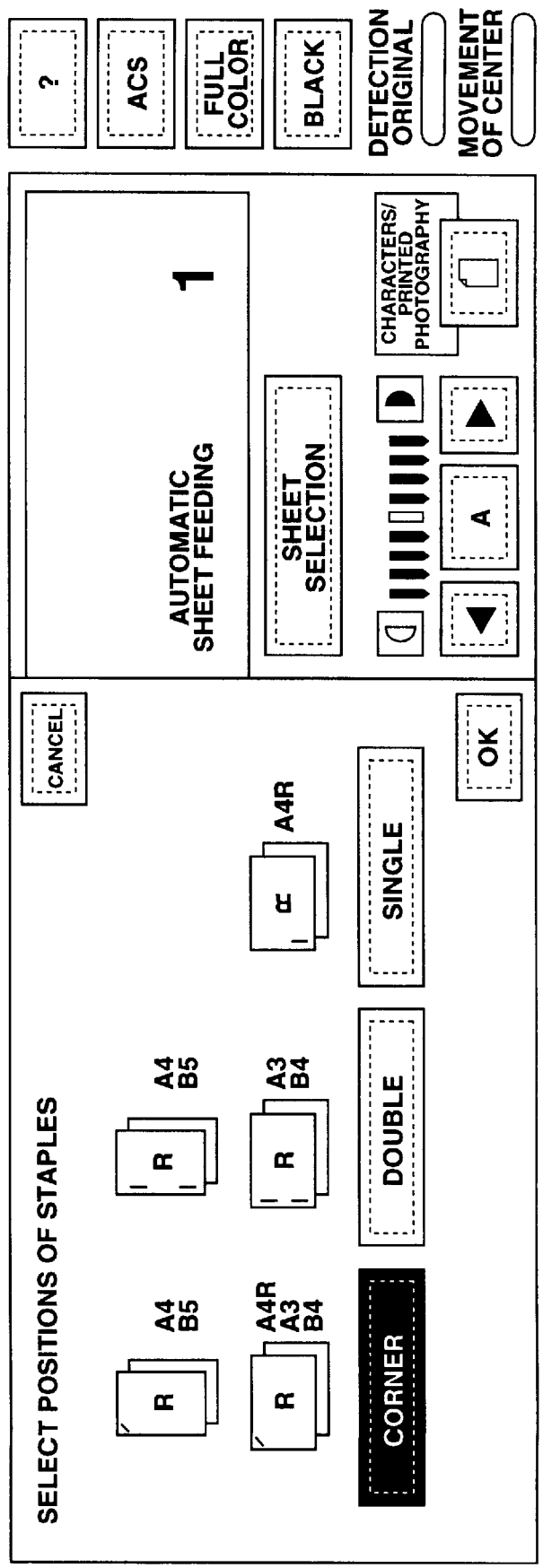

Next, a description will be provided of setting of stapling processing with reference to the flowchart of control of the CPU 106 shown in FIG. 6. When the touch key 616 is touched in the picture surface of FIG. 4, a picture surface shown in FIG. 7 is displayed. Then, when a touch key 631 for setting a stapling sorting is touched, the control shown in FIG. 6 is performed. First, a picture surface for setting the positions of staples as shown in FIG. 8 is displayed (step S1), and setting of the positions of staples by the user (selection of one of "corner", "double" and "single") is accepted (step S2). When "single" has been set (in step S3), a register corresponding to "single" is set (step S4). When "double" has been set, a register corresponding to "double" is set (step S5). When "corner" has been set, a register corresponding to "corner" is set (step S6). Then, the picture surface shown in FIG. 4 is displayed. A staple-position signal corresponding to the contents of the concerned register is output from the CPU 106 to the sorter 5.

Figure 9:
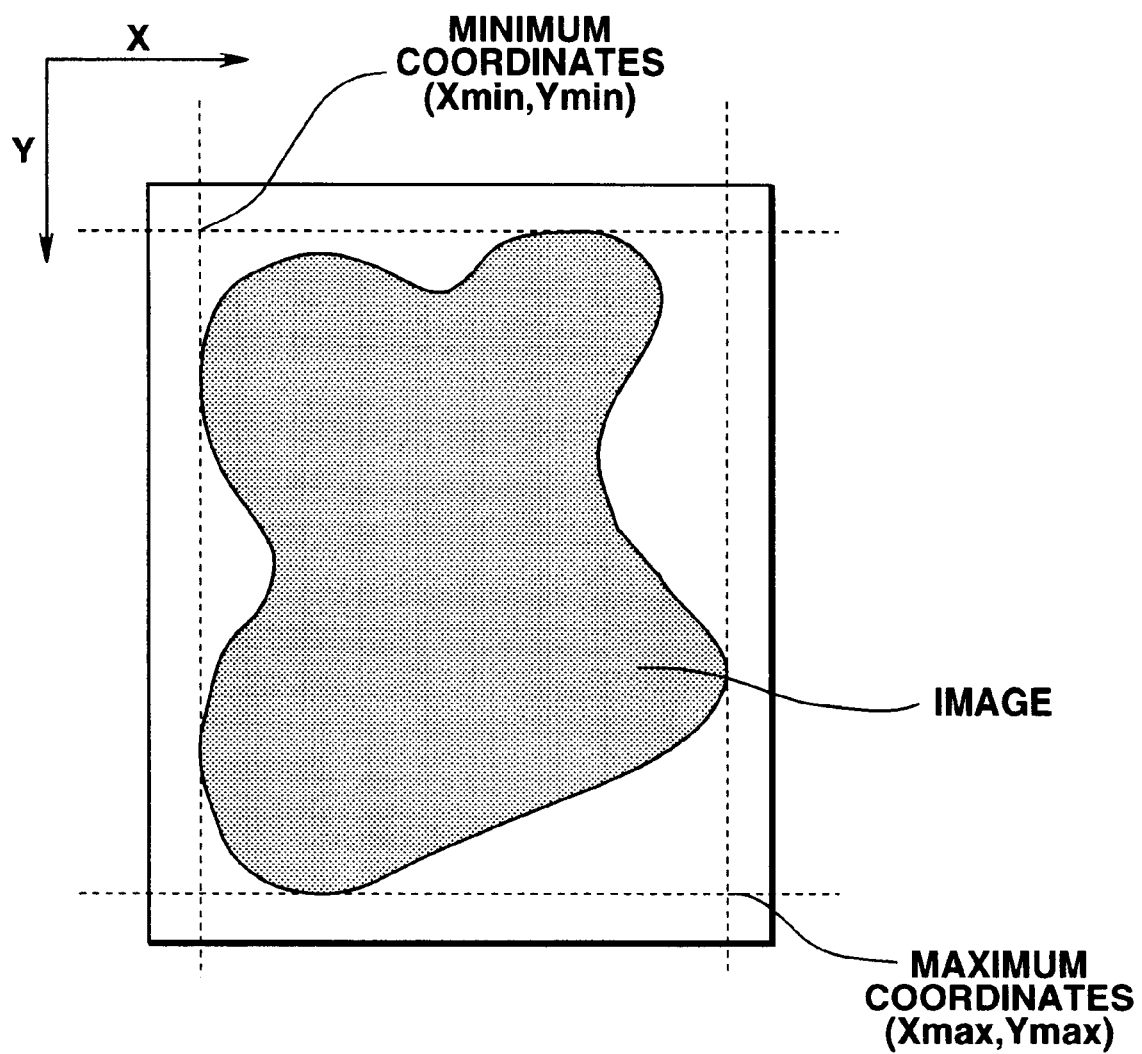
FIG. 9 is a diagram illustrating detection of the size of an image of an original.

Then, it is determined if a preview mode has been set on the picture surface shown in FIG. 4, i.e., if the preview start key 621 shown in FIG. 5 has been touched (step S7). When start of preview has been instructed, the original is fed onto the platen glass 101 by the original-feeder 4 (step S8), and the fed original is read and read image data is stored in the memory 104 (step S9). The image processing unit 105 reads out the image data stored in the memory 104, detects the size of an image obtained after performing image processing set through the operation unit 6 in the form of the maximum coordinates and the minimum coordinates as shown in FIG. 9, and stores these values in a register. The CPU 106 reads out the maximum coordinates and the minimum coordinates from the register within the image processing unit 105 (step S10), compares the read values with the coordinates of the positions of staples indicated by the contents of the register set in steps S4–S6 (step S11), and determines if the selected positions of staples are within the image region (step S12).

If the result of the determination in step S12 is affirmative, the distance between the coordinate of the positions of staples and the minimum coordinate in the x direction (see FIG. 9) is calculated in the number of bits, and the calculated value is stored (step S13). By obtaining the sum of the calculated distance between the coordinate of the positions of staples and the minimum coordinate, and the maximum coordinate, and determining if the coordinate of the result of the addition is within the size of the recording sheet in the x direction, it is determined if parallel movement can be performed (step S14).

If the result of the determination in step S12 is negative, an image obtained by synthesizing a preview image and an image indicating the positions of staples is displayed on the display 2 (step S15). If the result of the determination in step S14 is affirmative, the preview image is subjected to parallel movement based on the stored distance between the coordinate of the positions of staples and the minimum coordinate, and an image obtained by synthesizing the preview image subjected to the parallel movement and an image indicating the positions of staples is displayed (step S15).

If the result of the determination in step S14 is negative, the preview image is displayed on the display 2 while producing an alarm sound using a buzzer or the like (not shown) until an OK key or the like (not shown) on the operation unit 6 is depressed, and an alarm display is performed by displaying an image indicating the positions of staples with a conspicuous color, such as red or the like, or by flashing the image (steps S17 and S18).

Figure 10:
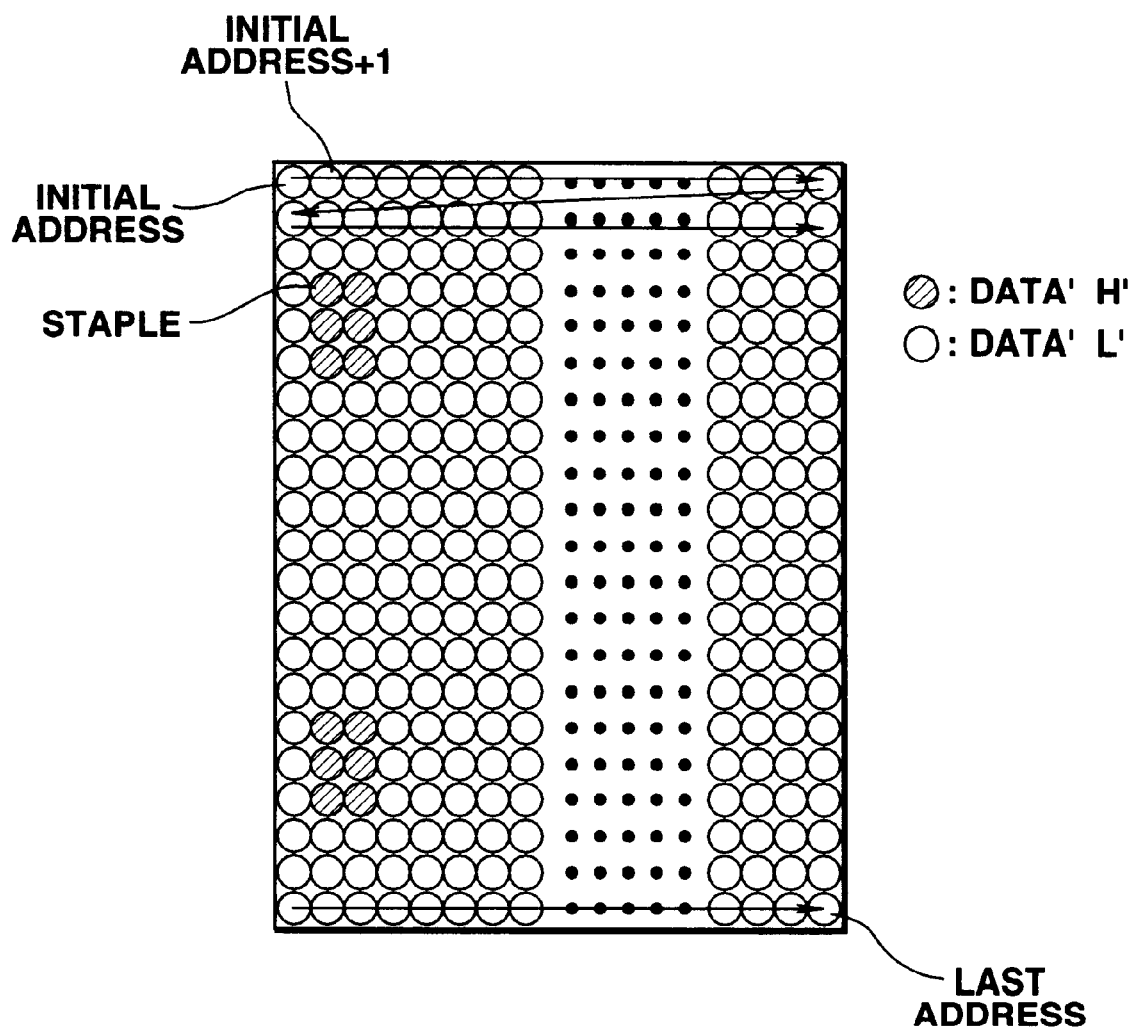
FIG. 10 is a diagram illustrating display of an image indicating the positions of staples.

In step S15 or S16, if, for example, "double" is set for the positions of staples, data as shown in FIG. 10 is written in the memory. The data is sequentially read starting from an initial address of the memory, and an image obtained by synthesizing an image represented by the data and an image input from the image processing unit 105 is displayed on the display 2. When intending to flash the image indicating the positions of staples, the image shown in FIG. 10 may be alternately sinthesized and not be synthesized periodically.

When the OK key has been depressed as a result of determination in step S17 or when a preview display has been performed in step S15, it is then determined if an unread original remains on the original-feeder 4 (step S19). If the result of the determination in step S19 is affirmative, the process returns to step S8. If the result of the determination in step S19 is negative, the processing of setting staples is terminated.

Figure 11:
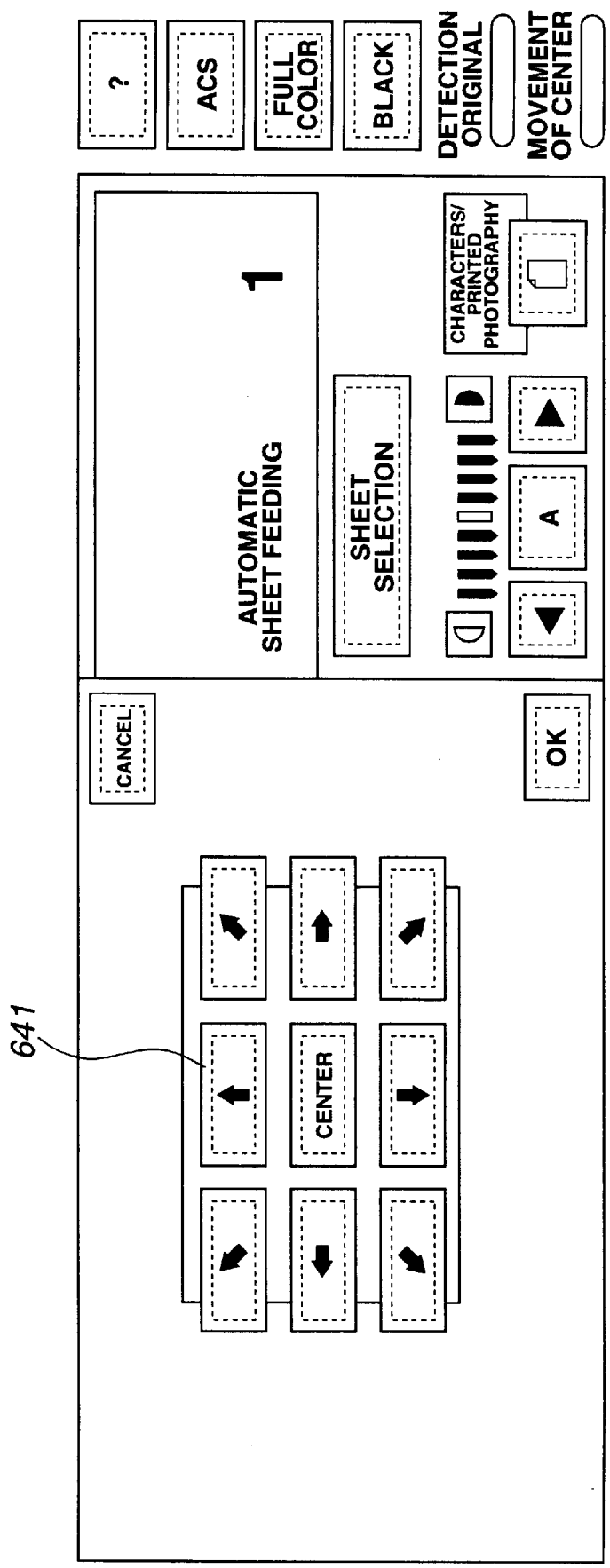
FIG. 11 is a diagram illustrating a picture surface of the operation unit.

When the OK key has not been depressed as a result of the determination in step S17, a picture surface shown in FIG. 11 is displayed on the operation unit 6, and the user manually moves the image of the original to a position where the image does not overlap with the positions of staples using original-image moving keys 641. At that time, the image and the positions of staples after the movement are displayed on the display 2, linked with the operation of the original-image moving keys 641.

As described above, it is automatically determined if the image overlaps with the positions of staples. If the result of the determination is affirmative, the image of the original is automatically subjected to parallel movement. If it has been determined that the image cannot be confined within the recording sheet if the image is subjected to parallel movement so as not overlap with the positions of staples, the user can manually correct the position of the image.

After performing such setting processing and preview processing, if the copying start key 601 is depressed in a state in which the above-described stapling sorting mode is set, the image processing unit 105 performs image processing, inclusive of the above-described parallel processing, of the image data stored in the memory 104, and outputs the resultant image to the printer unit 3, which performs a copying operation. The sorter 5 sorts recording sheets discharged from the printer unit 3 during copying operations, and performs stapling processing at positions in accordance with an instruction of the positions of staples from the CPU 106 after completing the copying operations.

The above-described control by the CPU 106 is executed by a computer program, which is stored in the ROM in this image forming system. Such a program may also be stored in a CD(compact disc)-ROM or a floppy disk, and may be executed by being read out by a personal computer. In such a case, setting of the positions of staples and preview processing are performed at the personal computer side. The personal computer outputs image data and data relating to the positions of staples to the printer unit 3, which executes printing processing and stapling processing.

As described above, since it is determined if binding positions are present within a region corresponding to an image to be output, editing processing relevant to the coordinates of the region and the coordinates of the binding positions is performed for the image, and an image obtained by synthesizing the image to be recorded and the binding positions is displayed before outputting the image, it is possible to prevent in advance overlap of the image with the binding positions, and the user can confirm the relationship between the image region and the binding positions before outputting the image.

Second Embodiment

Figure 12:
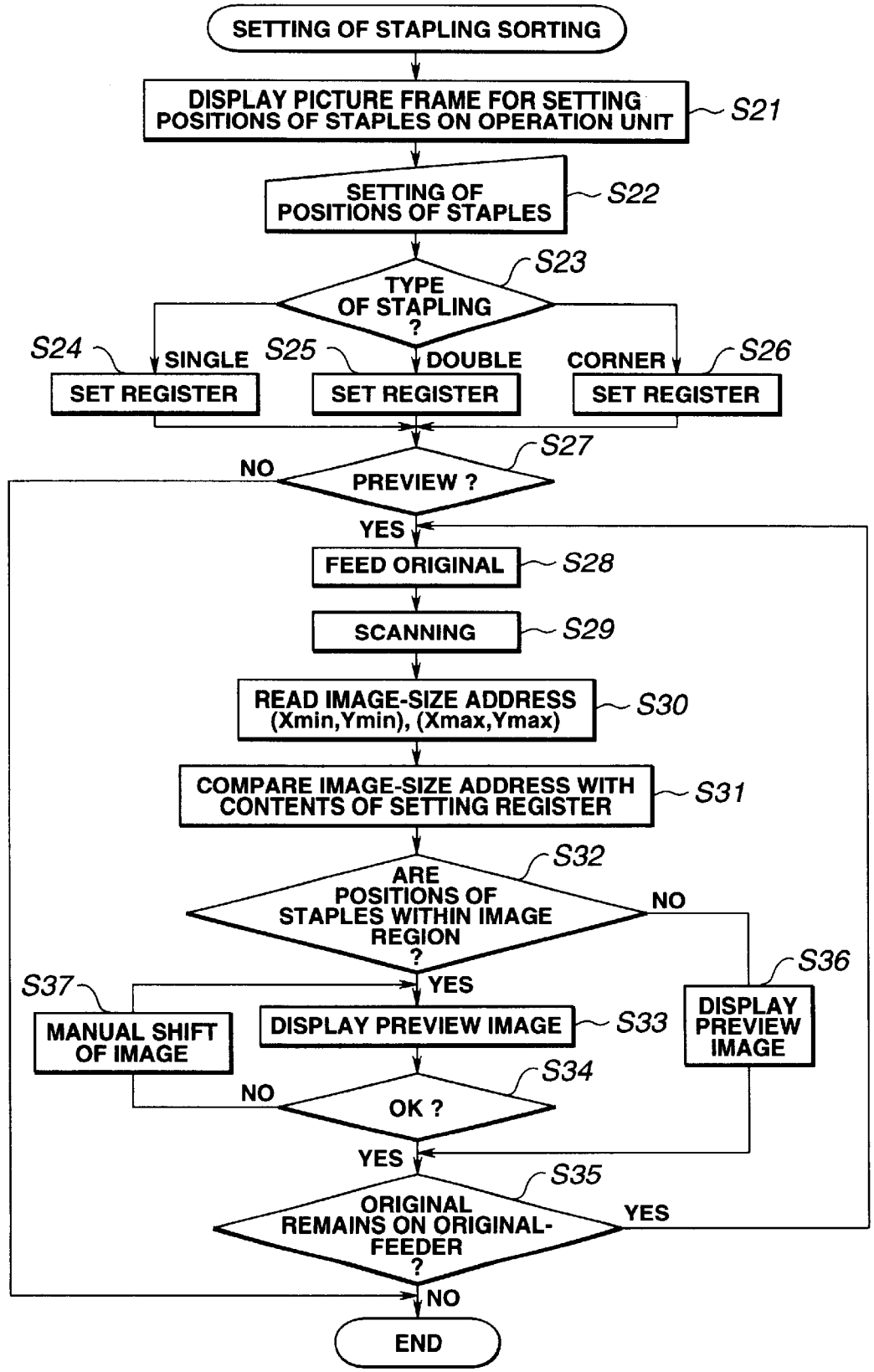
FIG. 12 is a flowchart illustrating control for setting stapling processing in a second embodiment of the present invention.

A description will now be provided of setting of stapling processing according to a second embodiment of the present invention with reference to the flowchart of control of the CPU 106 shown in FIG. 12.

When the touch key 616 has been touched on the picture surface shown in FIG. 4, the picture surface shown in FIG. 7 is displayed. Then, when the touch key 631 for setting stapling sorting has been touched, the control shown in FIG. 12 is performed. First, a picture surface for setting the positions of staples as shown in FIG. 8 is displayed (step S21), and setting of the positions of staples by the user (selection of one of "corner", "double" and "single") is accepted (step S22). When "single" has been set (in step S23), a register corresponding to "single" is set (step S24). When "double" has been set, a register corresponding to "double" is set (step S25). When "corner" has been set, a register corresponding to "corner" is set (step S26). Then, the picture surface shown in FIG. 4 is displayed. A staple-position signal corresponding to the contents of the concerned register is output from the CPU 106 to the sorter 5.

Then, it is determined if the preview mode has been set on the picture surface shown in FIG. 4, i.e., if the preview start key 621 shown in FIG. 5 has been touched (step S27). When start of preview has been indicated, the original is fed onto the platen glass 101 by the original-feeder 4 (step S28), and the fed original is read and read image data is stored in the memory 104 (step S29). The image processing unit 105 reads out the image data stored in the memory 104, detects the size of an image obtained after performing image processing set through the operation unit 6 in the form of the maximum coordinates and the minimum coordinates as shown in FIG. 9, and stores these values in a register. The CPU 106 reads out the maximum coordinates and the minimum coordinates from the register within the image processing unit 105 (step S30), compares the read values with the coordinates of the positions of staples indicated by the contents of the register set in steps S24–S26 (step S31), and determines if the selected positions of staples are within the image region (step S32).

If the result of the determination in step S32 is affirmative, the preview image is displayed on the display 2 while producing an alarm sound using a buzzer or the like (not shown) until an OK key or the like (not shown) on the operation unit 6 is depressed, and an alarm display is performed by displaying an image indicating the positions of staples with a conspicuous color, such as red or the like, or by flashing the image (steps S33 and S34).

In step S33, if, for example, "double" is set for the positions of staples, data as shown in FIG. 10 is written in the memory. The data is sequentially read starting from an initial address of the memory, and an image obtained by synthesizing an image represented by the data and an image input from the image processing unit 105 is displayed on the display 2. When intending to flash the image indicating the positions of staples, the image shown in FIG. 10 may be alternately sinthesized and not be synthesized periodically.

If the result of the determination in step S32 is negative, an image obtained by synthesizing a preview image and an image indicating the positions of staples is displayed on the display 2 (step S36). When the OK key has been depressed as a result of determination in step S34 or when a preview display has been performed in step S36, it is then determined if an unread original remains on the original-feeder 4 (step S35). If the result of the determination in step S35 is affirmative, the process returns to step S28. If the result of the determination in step S35 is negative, the processing of setting staples is terminated.

When the OK key has not been depressed as a result of the determination in step S34, the picture surface shown in FIG. 11 is displayed on the operation unit 6, and the user manually moves the image of the original to a position where the image does not overlap with the positions of staples using the original-image moving keys 641. At that time, the image and the positions of staples after movement are displayed on the display 2, linked with the operation of the original-image moving keys 641.

As described above, the user can preview the image and the positions of staples on the display 2. When the positions of staples overlap with the image, the user can manually correct the position of the image so that the image does not overlap with the positions of staples. After performing such setting processing and preview processing, if the copying start key 601 is depressed in a state in which the above-described stapling sorting mode is set, the image processing unit 105 performs image processing of the image data stored in the memory 104, and outputs the resultant image to the printer unit 3, which performs a copying operation. The sorter 5 sorts recording sheets discharged from the printer unit 3 during copying operations, and performs stapling processing at positions in accordance with an instruction of the positions of staples from the CPU 106 after completing the copying operations.

The above-described control by the CPU 106 is executed a computer program, which is stored in the ROM in this image forming system. Such a program may also be stored in a CD-ROM or a floppy disk, and may be executed by being read out by a personal computer. In such a case, setting of the positions of staples and preview processing are performed at the personal computer side. The personal computer outputs image data and data relating to the positions of staples to the printer unit 3, which executes printing processing and stapling processing.

As described above, an image obtained by synthesizing an image to be recorded and an image indicating binding positions is displayed, it is then determined if the binding positions are present within a region corresponding to an image to be output, and notification is performed in accordance with the result of determination, before outputting an input image. Hence, the user can notice that the binding positions are within the image region and confirm the relationship between the image and the binding positions before outputting the image.

The individual components shown in outline or designated by blocks in the drawings are all well-known in the image processing apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:

image input means for inputting a first image which is on an original and is constituted by an image region and a non-image region;

binding-position input means for inputting a binding position on a sheet on which said image region is to be formed;

a display unit which displays a preview of said first image and overlappingly displays a second image indicating the binding position input by said binding-position input means on said preview of said first image; and checking means for checking whether the binding position input for said first image by said binding-position input means overlaps said image region of said first image.

2. An apparatus according to claim 1, further comprising:

image output means for outputting said image region to an image forming apparatus, and wherein said checking means further comprises determination means for determining whether said image region can be shifted.

3. An apparatus according to claim 2, further comprising:

shifting means for shifting said image region in accordance with a result of the determination by said determination means.

4. An apparatus according to claim 3, wherein said image forming apparatus comprises a printer for recording said image region on the sheet, and said image forming apparatus records on the sheet said image region after having been shifted by said shifting means.

5. An apparatus according to claim 3, wherein said shifting means shifts said image region when the binding position overlaps with said image region.

6. An apparatus according to claim 5, wherein said shifting means shifts said image region so as to prevent the binding position from overlapping with said image region.

7. An apparatus according to claim 6, further comprising:
second determination means for determining whether said image region is confined in the sheet; and
prohibition means for prohibiting an operation of said shifting means in accordance with a result of the determination by said second determination means.

8. An apparatus according to claim 6, wherein a warning is displayed on said display unit, as well as prohibiting an operation of said shifting means, when said image region is not confined in the sheet.

9. An apparatus according to claim 6, wherein an operation of said shifting means is prohibited until an instruction is input from an operator when said image region is not confined in the sheet.

10. An image processing apparatus according to claim 1, wherein said image input means comprises a scanner for reading an image of an original.

11. An apparatus according to claim 2, further comprising:
notification means for performing a notification in accordance with a result of the determination of said determination means before an image forming operation is performed by said image forming apparatus.

12. An apparatus according to claim 11, wherein said notification means notifies an operator that the binding position input by said binding-position input means overlaps with said image region.

13. An apparatus according to claim 12, wherein said notification means displays a warning on said display unit when the binding position input by said binding-position input means overlaps with said image region.

14. An apparatus according to claim 13, wherein said notification means causes said second image, which indicates the binding position, to blink on said display unit when the binding position input by said binding-position input means overlaps with said image region.

15. An image processing method comprising:
an image inputting step of inputting a first image which is on an original and is constituted by an image region and a non-image region;
a binding-position inputting step of inputting a binding position on a sheet on which an image is to be formed;
a displaying step of displaying a preview of the first image on a display unit, wherein a second image indicating the input binding position is displayed on the preview of the first image; and
a checking step for checking whether the binding position input by the binding-position input step overlaps with the image region of the first image.

16. A method according to claim 15, further comprising:
an outputting step of outputting said image region to an image forming apparatus, and
wherein said checking step further comprises a determination step of determining whether the image region can be shifted.

17. A method according to claim 16, further comprising:
a notification step of performing notification in accordance with a result of the determination of said determination step before an image forming operation is performed by the image forming apparatus.

18. A method according to claim 17, wherein said notification step notifies an operator that the input binding position overlaps with the image region.

19. A method according to claim 18, wherein said notification step displays a warning on the display unit when the input binding position overlaps with the image region.

20. A method according to claim 18, wherein said notification step causes the second image indicating the binding position to blink on the display unit when the input binding position overlaps with the image region.

21. A method according to claim 16, further comprising:
a shifting step of shifting the image region in accordance with a result of the determination in said determination step.

22. A method according to claim 21, wherein the image forming apparatus comprises a printer for recording the image region on the sheet, and the image forming apparatus records the shifted image region on the sheet.

23. A method according to claim 21, wherein said shifting step shifts the image region when the binding position overlaps with the image region.

24. A method according to claim 23, wherein said shifting step shifts the image region so as to prevent the binding position from overlapping with the image region.

25. A method according to claim 24, further comprising:
a second determination step of determining whether the image region is confined in the sheet; and
a prohibiting step of prohibiting the image region from being shifted in accordance with a result of the determination by said second determination step.

26. A method according to claim 24, wherein a warning is displayed on the display unit, as well as prohibiting the image region from being shifted, when the image region is not confined in the sheet.

27. A method according to claim 24, wherein the image region is prohibited from being shifted until an instruction is input from an operator when the image region is not confined in the sheet.

28. A method according to claim 15, wherein said image inputting step reads an image of an original by a scanner.

29. A computer-readable storage medium for storing a program which comprises code for performing the steps comprising:
an image inputting step of inputting a first image which is on an original and is constituted by an image region and a non-image region;
a binding-position inputting step of inputting a binding position on a sheet on which an image is to be formed;
a displaying step of displaying a preview of the first image on a display unit, wherein a second image indicating the input binding position is displayed on the preview of the first image; and
a checking step of checking whether the binding position input during said binding-position input step overlaps the image region of the first image.

30. A computer-readable storage medium according to claim 29, further comprising:
an image output step for outputting said image region to an image forming apparatus, and
wherein said checking step further comprises a first determination step for determining whether said image region can be shifted.

31. A computer-readable storage medium according to claim 30, further comprising:
   a notification step for performing a notification in accordance with a result of the determination of said determination step before an image forming operation is performed by said image forming apparatus.

32. A computer-readable storage medium according to claim 31, wherein said notification step notifies an operator that the binding position input by said binding-position input step overlaps with said region.

33. A computer-readable storage medium according to claim 32, wherein said notification step displays a warning on said display unit when the binding position input by said binding-position input step overlaps with said image region.

34. A computer-readable storage medium according to claim 33, wherein said notification step causes said second image, which indicates the binding position, to blink on said display unit when the binding position input by said binding-position input step overlaps with said image region.

35. A computer-readable storage medium according to claim 30, further comprising:
   a shifting step for shifting said image region in accordance with a result of the determination by said determination step.

36. A computer-readable storage medium according to claim 35, wherein said image forming apparatus comprises a printer for recording said image region on the sheet, and said image forming apparatus records on the sheet said image region after having been shifted by said shifting step.

37. A computer-readable storage medium according to claim 35, wherein said shifting step shifts said image region when the binding position overlaps with said image region.

38. A computer-readable storage medium according to claim 37, wherein said shifting step shifts said image region so as to prevent the binding position from overlapping with said image region.

39. A computer-readable storage medium according to claim 38, further comprising:
   a second determination step for determining whether said image region is confined in the sheet; and
   a prohibition step for prohibiting an operation of said shifting step in accordance with a result of the determination by said second determination step.

40. A computer-readable storage medium according to claim 38, wherein a warning is displayed on said display unit, as well as prohibiting an operation of said shifting step, when said image region is not confined in the sheet.

41. A computer-readable storage medium according to claim 38, wherein an operation of said shifting step is prohibited until an instruction is input from an operator when said image region is not confined in the sheet.

42. A computer-readable storage medium processing apparatus according to claim 29, wherein said image input step comprises a scanning step for reading an image of an original.

43. An image processing apparatus comprising:
   image input means for inputting a first image which is on an original;
   binding-position input means for inputting a binding position on a sheet on which an image is to be formed; and
   checking means for checking whether the binding position input by said binding-position input means would overlap said image when said image is formed on the sheet.

44. An apparatus according to claim 43, further comprising:
   image output means for outputting said image to an image forming apparatus, and
   wherein said checking means further comprises determination means for determining whether said image can be shifted.

45. An apparatus according to claim 44, further comprising:
   notification means for performing notification in accordance with a result of the determination of said determination means before an image forming operation is performed by said image forming apparatus.

46. An apparatus according to claim 45, wherein said notification means notifies an operator that the binding position input by said binding-position input means would overlap with said image when formed on the sheet.

47. An apparatus according to claim 46, wherein said notification means displays a warning on said display unit when the binding position input by said binding-position input means would overlap with said image when formed on the sheet.

48. An apparatus according to claim 47, wherein said notification means causes said second image indicating the binding position to blink on said display unit when the binding position input by said binding-position input means would overlap with said image when formed on the sheet.

49. An apparatus according to claim 44, further comprising:
   shifting means for shifting said image in accordance with a result of the determination by said determination means.

50. An apparatus according to claim 49, wherein said shifting means shifts said image when the binding position overlaps with said image.

51. An apparatus according to claim 50, wherein said image forming apparatus comprises a printer for recording on the sheet said image after having been shifted by said shifting means.

52. An apparatus according to claim 50, wherein said shifting means shifts said image so as to prevent the binding position from overlapping with said image.

53. An apparatus according to claim 50, further comprising:
   second determination means for determining whether said image would be confined in the sheet; and
   prohibition means for prohibiting an operation of said shifting means in accordance with a result of the determination by said second determination means.

54. An apparatus according to claim 52, wherein a warning is displayed on said display unit, as well as prohibiting an operation of said shifting means, when said image would not be confined in the sheet.

55. An apparatus according to claim 52, wherein an operation of said shifting means is prohibited until an instruction is input from an operator when said image would not be confined in the sheet.

56. An apparatus according to claim 43, wherein said image input means comprises a scanner for reading an image of an original.

57. An image processing method comprising:
   an image inputting step of inputting a first image which is on an original;
   a binding-position inputting step of inputting a binding position on a sheet on which an image is to be formed; and
   a checking step for checking whether the binding position input by said binding-position input step would overlap the image is formed on the sheet.

58. An image processing method according to claim 57, further comprising:

an image output step for outputting said image to an image forming apparatus, and wherein said checking step further comprises a first determination step for determining whether said image can be shifted.

59. An image processing method according to claim 58, further comprising:

a notification step for performing notification in accordance with a result of the determination of said determination step before an image forming operation is performed by said image forming apparatus.

60. An image processing method according to claim 59, wherein said notification step notifies an operator that the binding position input by said binding-position input step would overlap with said image when formed on the sheet.

61. An image processing method according to claim 60, wherein said notification step displays a warning on said display unit when the binding position input by said binding-position input step would overlap with said image when formed on the sheet.

62. An image processing method according to claim 61, wherein said notification step causes said second image indicating the binding position to blink on said display unit when the binding position input by said binding-position input step would overlap with said image when formed on the sheet.

63. An image processing method according to claim 57, further comprising:

a shifting step for shifting said image in accordance with a result of the determination by said determination step.

64. An image processing method according to claim 63, wherein said shifting step shifts said image when the binding position overlaps with said image.

65. An image processing method according to claim 64, wherein said image forming apparatus comprises a printer for recording on the sheet said image after having been shifted by said shifting step.

66. An image processing method according to claim 64, wherein said shifting step shifts said image so as to prevent the binding position from overlapping with said image.

67. An image processing method according to claim 66, further comprising:

a second determination step for determining whether said image would be confined in the sheet; and a prohibition step for prohibiting an operation of said shifting step in accordance with a result of the determination by said second determination step.

68. An image processing method according to claim 66, wherein a warning is displayed on said display unit, as well as prohibiting an operation of said shifting step, when said image would not be confined in the sheet.

69. An image processing method according to claim 66, wherein an operation of said shifting step is prohibited until an instruction is input from an operator when said image would not be confined in the sheet.

70. An image processing method according to claim 57, wherein said image input step comprises a scanning step for reading an image of an original.

71. A computer-readable storage medium for storing a program comprising code for the performing the steps comprising:

an image inputting step of inputting a first image which is on an original;

a binding-position inputting step of inputting a binding position on a sheet on which an image is to be formed; and a checking step for checking whether the binding position input by said binding-position input step would overlap the image when the image is formed on the sheet.

72. A computer-readable storage medium according to claim 71, further comprising:

an image output step for outputting said image to an image forming apparatus, and wherein said checking step further comprises a first determination step for determining whether said image can be shifted.

73. An apparatus according to claim 72, further comprising:

a notification step for performing notification in accordance with a result of the determination of said determination step before an image forming operation is performed by said image forming apparatus.

74. A computer-readable storage medium according to claim 73, wherein said notification step notifies an operator that the binding position input by said binding-position input step would overlap with said image when formed on the sheet.

75. A computer-readable storage medium according to claim 74, wherein said notification means displays a warning on said display unit when the binding position input by said binding-position input step would overlap with said image when formed on the sheet.

76. A computer-readable storage medium according to claim 75, wherein said notification step causes said second image indicating the binding position to blink on said display unit when the binding position input by said binding-position input step would overlap with said image when formed on the sheet.

77. A computer-readable storage medium according to claim 72, further comprising:

a shifting step for shifting said image in accordance with a result of the determination by said determination step.

78. A computer-readable storage medium according to claim 77, wherein said shifting step shifts said image when the binding position overlaps with said image.

79. A computer-readable storage medium according to claim 78, wherein said image forming apparatus comprises a printer for recording on the sheet said image after having been shifted by said shifting step.

80. A computer-readable storage medium according to claim 78, wherein said shifting step shifts said image so as to prevent the binding position from overlapping with said image.

81. A computer-readable storage medium according to claim 80, further comprising:

a second determination step for determining whether said image would be confined in the sheet; and a prohibition step for prohibiting an operation of said shifting step in accordance with a result of the determination by said second determination step.

82. A computer-readable storage medium according to claim 80, wherein a warning is displayed on said display unit, as well as prohibiting an operation of said shifting step, when said image would not be confined in the sheet.

83. A computer-readable storage medium according to claim 80, wherein an operation of said shifting step is prohibited until an instruction is input from an operator when said image would not be confined in the sheet.

84. A computer-readable storage medium according to claim 71, wherein said image input step comprises a scanning step for reading an image of an original.

85. An image processing apparatus comprising:

an input terminal for inputting a first image which is on an original and is constituted by an image region and a nonimage region;

an operation panel for inputting a binding position on a sheet on which said image region is to be formed;

a display which displays a preview of said first image and overlappingly displays a second image indicating the binding position input by said operation panel on said preview of said first image.

a checker for checking whether the binding position input for said first image by said operation panel overlaps said image region of said first image.

86. An image processing apparatus comprising:

an input terminal for inputting a first image which is on an original and is constituted by an image region and a nonimage region;

an operation panel for inputting a binding position on a sheet on which said image region is to be formed;

a checker for checking whether the binding position input for said first image by said operation panel overlaps said image region of said first image.

* * * * *

UNITED STATES PATENT AND TRADEMARK OFFICE
CERTIFICATE OF CORRECTION

PATENT NO.    : 6,473,539 B1
DATED         : October 29, 2002
INVENTOR(S)   : Katsuhide Koga It is certified that error appears in the above-identified patent and that said Letters Patent is hereby corrected as shown below:

Drawings,
Sheet 2, in Figure 2, "83" should read -- 3 --.

Column 1,
Lines 16 and 19, "of" should be deleted.

Column 3,
Line 21, "th" should read -- the --.

Column 4,
Line 20, "represents" should read -- represent --.
Line 23, "shown" should read -- shown by --.
Line 45, "displaydirection" should read -- display-direction --.

Column 5,
Lines 18 and 22, "coordinate" should read -- coordinates --.
Line 26, "if" should read -- where --.
Line 34, "dinate" should read -- dinates --.
Line 55, "sinthesized" should read -- synthesized --.

Column 6,
Line 12, "overlap" should read -- to overlap --.

Column 7,
Line 36, "sinthesized" should read -- synthesized --.

Column 8,
Line 6, "executed" should read -- executed by --.
Line 18, "if" should read -- whether --.

Column 12,
Line 40, "claim 50," should read -- claim 52, --.
Line 67, "image" should read -- image when the image --.

UNITED STATES PATENT AND TRADEMARK OFFICE
CERTIFICATE OF CORRECTION

PATENT NO. : 6,473,539 B1
DATED : October 29, 2002
INVENTOR(S) : Katsuhide Koga

It is certified that error appears in the above-identified patent and that said Letters Patent is hereby corrected as shown below:

Column 15,
Line 7, "nonimage" should read -- non-image --.
Line 13, "image." should read -- image; and --.

Column 16,
Line 6, "nonimage" should read -- non-image --.
Line 8, "formed;" should read -- formed; and --.

Signed and Sealed this

Twenty-fourth Day of June, 2003

JAMES E. ROGAN
*Director of the United States Patent and Trademark Office*